US009645868B2

(12) United States Patent
Nandakumar

(10) Patent No.: US 9,645,868 B2
(45) Date of Patent: May 9, 2017

(54) METHODS OF RUNNING APPLICATIONS ON MOBILE DEVICES INCLUDING NOTIFICATIONS/BLOCKING RESPONSIVE TO RESOURCE CONSUMPTION

(71) Applicant: CA, INC., New York, NY (US)

(72) Inventor: Vikrant Nandakumar, Bangalore (IN)

(73) Assignee: CA, INC., New York, NY (US)

( * ) Notice: Subject to any disclaimer, the term of this patent is extended or adjusted under 35 U.S.C. 154(b) by 57 days.

(21) Appl. No.: 14/750,165

(22) Filed: Jun. 25, 2015

(65) Prior Publication Data

US 2016/0378578 A1   Dec. 29, 2016

(51) Int. Cl.
*G06F 3/00* (2006.01)
*G06F 9/54* (2006.01)
*G06F 9/50* (2006.01)
*G06F 9/44* (2006.01)

(52) U.S. Cl.
CPC .............. *G06F 9/547* (2013.01); *G06F 8/20* (2013.01); *G06F 9/50* (2013.01)

(58) Field of Classification Search
CPC .............. G06F 9/547; G06F 9/50; G06F 8/20
See application file for complete search history.

(56) References Cited

U.S. PATENT DOCUMENTS

| 2002/0199036 A1* | 12/2002 | Arnold | G06F 9/547 719/330 |
|---|---|---|---|
| 2003/0139966 A1* | 7/2003 | Sirota | G06Q 30/02 705/14.41 |
| 2014/0215242 A1* | 7/2014 | Jung | G06F 9/4893 713/322 |
| 2015/0089354 A1* | 3/2015 | Abrahami | G06F 17/3089 715/235 |

* cited by examiner

*Primary Examiner* — H S Sough
*Assistant Examiner* — Carina Yun
(74) *Attorney, Agent, or Firm* — Sage Patent Group

(57) ABSTRACT

A wrapped application may be stored in memory of a mobile device. The wrapped application includes application code and an application wrapper, and the application code integrates primary and secondary application modules and a policy monitoring plugin module. Operations of the application code may be executed on a processor of the mobile device using system events and/or API calls. Responsive to executing operations of the primary/secondary application modules of the application code, consumption of a mobile device resource by the secondary application module may be monitored using the policy monitoring plugin module of the application. Responsive to the consumption of the mobile device resource by the secondary application module exceeding a threshold, a notification of the consumption may be transmitted through a wireless communication interface of the mobile device to a third party source of the application code using the policy monitoring plugin module of the application.

22 Claims, 8 Drawing Sheets

9,645,868 B2

METHODS OF RUNNING APPLICATIONS ON MOBILE DEVICES INCLUDING NOTIFICATIONS/BLOCKING RESPONSIVE TO RESOURCE CONSUMPTION

FIELD

Inventive concepts described herein relate to applications for mobile computing devices, and more particularly, to monitoring of such applications.

BACKGROUND

A mobile application (also referred to as an app) is a type of application software designed to run on a mobile device, such as a smartphone or a tablet computer. Such an application may be developed for mobile devices and distributed in an application package containing the elements used to run the application, such as, program code, resources, certificates, and/or a manifest.

In some cases, a mobile application may be provided with application code including a primary application module defining a primary functionality(ies) of the application and a secondary application module defining a secondary functionality(ies) of the application. The primary functionality may be a functionality desired by the end user, such as a game, a media source, a browser, etc. The secondary functionality (e.g., advertising) may be independent of the primary functionality, and may be added to provide revenue to the application developer. A mobile application developer may independently develop the primary application module to provide a service/functionality that consumers may desire, and the mobile application developer may add the secondary application module (e.g., to provide advertisements) using third party code provided, for example, in a Software Development Kit (SDK). Use of such third party code may thus reduce a cost to develop the application.

When code from a third party is used to provide such a secondary application module, however, the application developer may not be fully aware of all aspects of operation of the secondary application module. When an application including such third party code is installed on a mobile device, for example, the third party code may cause unintended resource consumption at the mobile device, and/or may allow unintended access to and/or snooping of information at the mobile device by the third party.

SUMMARY

Some embodiments of the present disclosure are directed to methods of running an application on a mobile device including a memory with an operating system stored therein and a processor operating according to the operating system. A wrapped application may be stored in the memory of the mobile device wherein the wrapped application includes application code and an application wrapper providing an interface between the application code and the operating system. The application code may integrate a primary application module providing a primary functionality of the application, a policy monitoring plugin module, and a secondary application module providing a secondary functionality of the application. Operations of the application code including the primary and secondary application modules may be executed on the processor using system events provided from the operating system to the application code using the interface of the application wrapper and/or using API calls provided from the application code to the operating system using the interface of the application wrapper. Responsive to executing operations of the primary and/or secondary application modules of the application code, consumption of a mobile device resource may be monitored by the secondary application module providing the secondary functionality of the application code using the policy monitoring plugin module of the application. Responsive to the consumption of the mobile device resource by the secondary application module exceeding a threshold, a notification of the consumption may be transmitted through a wireless communication interface of the mobile device to a third party source of the application code using the policy monitoring plugin module of the application and the interface of the application wrapper.

Some other embodiments of the present disclosure are directed to a mobile device that includes a processor, a communication interface coupled to the processor, and a memory coupled to the processor and storing computer readable program code that when executed by the processor causes the processor to perform operations. More particularly, the computer readable program code may include a wrapped application in the memory of the mobile device wherein the wrapped application includes application code and an application wrapper providing an interface between the application code and the operating system, and wherein the application code integrates a primary application module providing a primary functionality of the application, a policy monitoring plugin module, and a secondary application module providing a secondary functionality of the application. The operations include: executing operations of the application code including the primary and secondary application modules on the processor using system events provided from the operating system to the application code using the interface of the application wrapper and/or using API calls provided from the application code to the operating system using the interface of the application wrapper; monitoring consumption of a mobile device resource by the secondary application module providing the secondary functionality of the application code using the policy monitoring plugin module of the application responsive to executing operations of the primary and/or secondary application modules of the application code; and transmitting a notification of the consumption through a wireless communication interface of the mobile device to a third party source of the application code using the policy monitoring plugin module of the application and the interface of the application wrapper responsive to the consumption of the mobile device resource by the secondary application module exceeding a threshold.

Still other embodiments of the present disclosure are directed to methods of running an application on a mobile device including a memory with an operating system stored therein and a processor operating according to the operating system. A wrapped application may be stored in the memory of the mobile device wherein the wrapped application includes application code and an application wrapper providing an interface between the application code and the operating system. The application code may integrate a primary application module providing a primary functionality of the application, a policy monitoring plugin module, and a secondary application module providing a secondary functionality of the application. Operations of the application code including the primary and secondary application modules may be executed on the processor using system events provided from the operating system to the application code using the interface of the application wrapper and/or using API calls provided from the application code to the operating system using the interface of the application wrapper. Responsive to executing operations of the primary and/or secondary application modules of the application code, consumption of a mobile device resource may be monitored by the secondary application module providing the secondary functionality of the application code using the policy monitoring plugin module of the application. Responsive to the consumption of the mobile device resource by the secondary application module exceeding a threshold, access of the secondary application module to a source of information may be selectively blocked while continuing to allow access of the primary application module to the source of information.

Yet other embodiments of the present disclosure are directed to a mobile device that includes a processor, a communication interface coupled to the processor, and a memory coupled to the processor and storing computer readable program code that when executed by the processor causes the processor to perform operations. More particularly, the computer readable program code may include a wrapped application in the memory of the mobile device wherein the wrapped application includes application code and an application wrapper providing an interface between the application code and the operating system, and wherein the application code integrates a primary application module providing a primary functionality of the application, a policy monitoring plugin module, and a secondary application module providing a secondary functionality of the application. The operations include: executing operations of the application code including the primary and secondary application modules on the processor using system events provided from the operating system to the application code using the interface of the application wrapper and/or using API calls provided from the application code to the operating system using the interface of the application wrapper; monitoring consumption of a mobile device resource by the secondary application module providing the secondary functionality of the application code using the policy monitoring plugin module of the application responsive to executing operations of the primary and/or secondary application modules of the application code; and selectively blocking access of the secondary application module to a source of information while continuing to allow access of the primary application module to the source of information responsive to the consumption of the mobile device resource by the secondary application module exceeding a threshold.

Other methods, computing devices, and computer program products according to embodiments of the present disclosure will be or become apparent to one with skill in the art upon review of the following drawings and detailed description. It is intended that all such methods, computing devices, and computer program products be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION OF EMBODIMENTS

Figure 1:
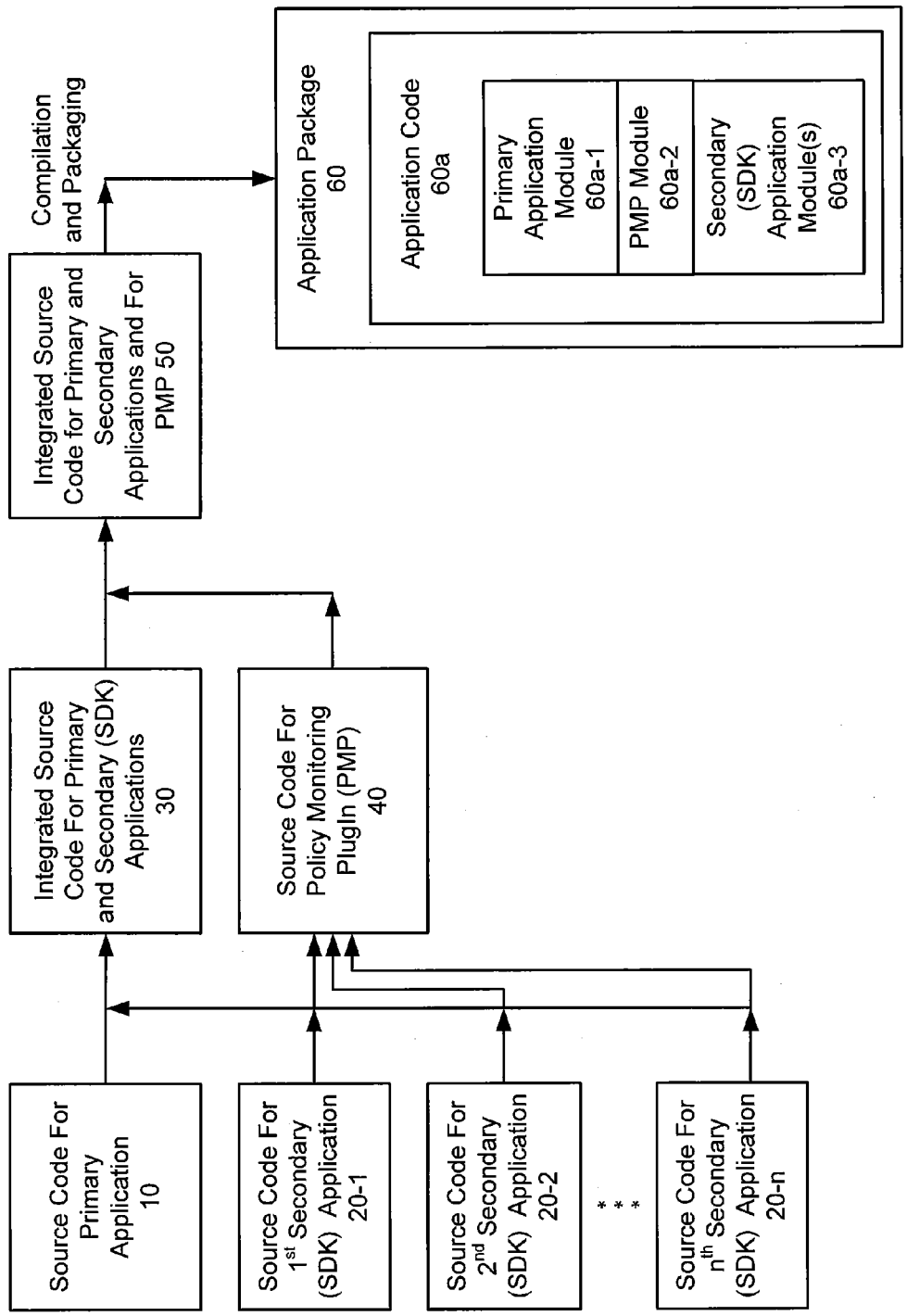
FIG. 1 is a block diagram illustrating operations of creating an application package and a structure of such an application package according to some embodiments of inventive concepts.

In the following detailed description, numerous specific details are set forth in order to provide a thorough understanding of embodiments of the present disclosure. However, it will be understood by those skilled in the art that present inventive concepts may be practiced without these specific details. In other instances, well-known methods, procedures, components and circuits have not been described in detail so as not to obscure present inventive concepts. It is intended that all embodiments disclosed herein can be implemented separately or combined in any way and/or combination.

According to some embodiments of inventive concepts, policy enforcement and/or monitoring of secondary application modules developed using third-party SDKs (Software Development Kits) may be integrated in mobile applications that are installed on mobile devices, such as, smartphones, tablet computers, etc. Considering that an SDK may be used to provide a secondary application module(s) that is tightly coupled with the primary application module in the application code and that the SDK secondary application module may have a same level of access privileges as the primary application module, enabling static/dynamic runtime policy enforcement and/or monitoring of operations of a third-party SDK secondary application module that is integrated in code of a mobile application may be useful.

Software developers may generally use paid third-party SDKs to develop secondary application modules (also referred to as SDK secondary application modules, SDK application modules, or SDK modules) for various purposes (referred to as secondary functionalities) such as advertisements (Ads), security, test automation, etc. Because these SDK modules are tightly coupled with the application (app) itself and the primary application module thereof, an SDK module may create security violation issues and/or performance issues. Currently, there is no methodology available to monitor and/or report such violations/performance issues created by SDK modules which aren't a part of the application's primary functionality (also referred to as an original or intended functionality). Accordingly, a policy control and/or monitoring engine which can control/manage such SDK modules may be useful to prevent/reduce SDK modules from snooping into application/device data and other information which is desirably available only to the primary application module and not the SDK/secondary application module.

As an example, a primary application module may be developed to provide media content (e.g., print media content such as newspaper or magazine content, music/audio streaming, video streaming, etc.), gaming, and/or other user desired functionality at a mobile device, and an SDK secondary application module (developed using a third party SDK) may be added to the application code to provide advertisements at the mobile device. Because the primary and secondary application modules are integrated in the application code, the SDK module for the advertisements may be able to "steal" the location of the mobile device (i.e., the location of the user) if the location information is available to the primary application module. Stated in other words, the third party provider of the SDK used for the secondary application module may be able to gain access to device/user information for a purpose that was not intended by the developer of the primary application module.

According to some embodiments of inventive concepts, a policy monitoring plugin (PMP) module may be integrated into the application code along with the primary and secondary application modules to monitor and/or reduce/prevent such unintended access by an SDK secondary application module based on a third party SDK. This policy monitoring plugin module can be configured to act in 2 different modes: (1) Pro-active Monitoring mode; and/or (2) Re-active Enforcement mode.

The PMP module may include a configuration file which takes input from the application developer on which parameters of the secondary application are to be monitored, thresholds for monitoring, how violations are to be reported back to the application developer and/or action to be taken responsive to such violations. A configurable UI (User Interface) may be available for the application developer to modify the configuration file (and thus the parameters) before and/or after the application is installed in a mobile device. Parameters of the secondary application module to be monitored may include Central Processing Unit (CPU) utilization (e.g. measured as a percentage of secondary application module CPU usage relative to overall application CPU usage), memory (e.g., random access memory or RAM) usage (e.g. measured as a percentage of secondary application module memory usage relative to overall application memory usage), battery/power consumption (e.g. measured as a percentage of secondary application module battery/power usage relative to overall application battery/power usage), network traffic snooping, location access control, etc. The application developer may configure these parameters when the application is developed, and/or the application developer can configure/reconfigure these parameters remotely once the application has been installed in a mobile device. For example, the application developer may turn monitoring of one or more of these parameters on/off before/after installation on a mobile device, and/or the application developer may set/reset a monitoring threshold for one or more of these parameters before/after installation on a mobile device.

In a pro-active monitoring mode, the PMP module will monitor the pre-configured set of parameters and send a report back to the application developer if any parameter thresholds are exceeded. Through a console type of UI (user interface), the application developer may easily scan through reported violations committed by the 3rd party SDK module(s) and take appropriate action.

In a re-active enforcement mode, the PMP module may both detect SDK module violations and also block unauthorized access to the application's sandbox files, to location information, etc., for which the SDK module does not have appropriate permissions.

FIG. 1 is a block diagram illustrating a development flow used to create an application package 60 including application code 60a with a primary application module 60a-1, a PMP module 60a-2, and a secondary (SDK) module(s) 60a-3 and a structure of such an application package according to some embodiments of inventive concepts. For example, the application developer may independently develop source code for the primary application 10 using the Android operating system, and source code for one or more secondary applications 20-1 to 20-n may be developed using one or more respective third party software development kits (SDKs). As discussed above, the source code for the primary application 10 may support user desired functionality (i.e., primary functionality for a primary application module), such as, electronic gaming, media content access, etc., and the source code for each secondary application(s) may provide other functionality (i.e., secondary functionality for a secondary application module), such as, advertising. For example, the secondary functionality may provide advertisements that are required to be presented (e.g., as video, audio, etc.) at the mobile device input/output interface as a condition for use of the primary functionality. Third party advertisements provided using secondary functionality of a secondary module may thus be used to provide a source of revenue to the application developer, for example, if the application is provided at no/low cost.

The source code for the primary and secondary applications 10 and 20-1 to 20-n may be integrated to provide integrated source code for primary and secondary applications 30. In addition, source code for a policy monitoring plugin 40 may be developed based on the source code for the one or more secondary applications 20-1 to 20-n. Source code for the policy monitoring plugin may then be integrated to provide integrated source code for primary and secondary applications and for the policy monitoring plugin 50, and the integrated source code 50 may be provided as an application project including various files (including source code, libraries, resources, and certificates) for the primary and secondary applications and for the policy monitoring plugin.

The integrated source code 50 (also referred to as an application project) may be compiled into binary executable code that is packaged along with the associated resources and manifest to provide application package 60 including application code 60a with primary application module 60a-1, PMP module 60a-2, and secondary module 60a-3. As shown, the PMP module 60a-2 may be functionally provided between the primary application module 60a-1 and the secondary (SDK) module(s) 60a-3 to monitor and/or control/block operations of the secondary module(s) 60a-3.

The primary application and/or the policy monitoring plugin may be written in a high level programming language, such as Java. During compilation and packaging, integrated source code 50 may be first compiled into a binary format and then converted into a format appropriate for the operating system on which the application is to be used. For a Java application running on an Android platform, for example, the source code may first be compiled into class files in the Java bytecode format, which are then converted into ".dex" files in the Dalvik bytecode. The Dalvik bytecode is the native format of the Android operating system.

The application package 60, such as an Android Package in the ".apk" format, may then be generated including the binary program code in ".dex" files, along with associated resources and a manifest file. During installation onto a device 301, the operating system of the device 301 may read the manifest file and unpack and install the program code and associated resources from the .apk file on the device 301. The device 301 may be an end-user device such as a smart phone, tablet computer, laptop computer, desktop computer, appliance terminal (e.g., thermostat), etc.

Figure 2:
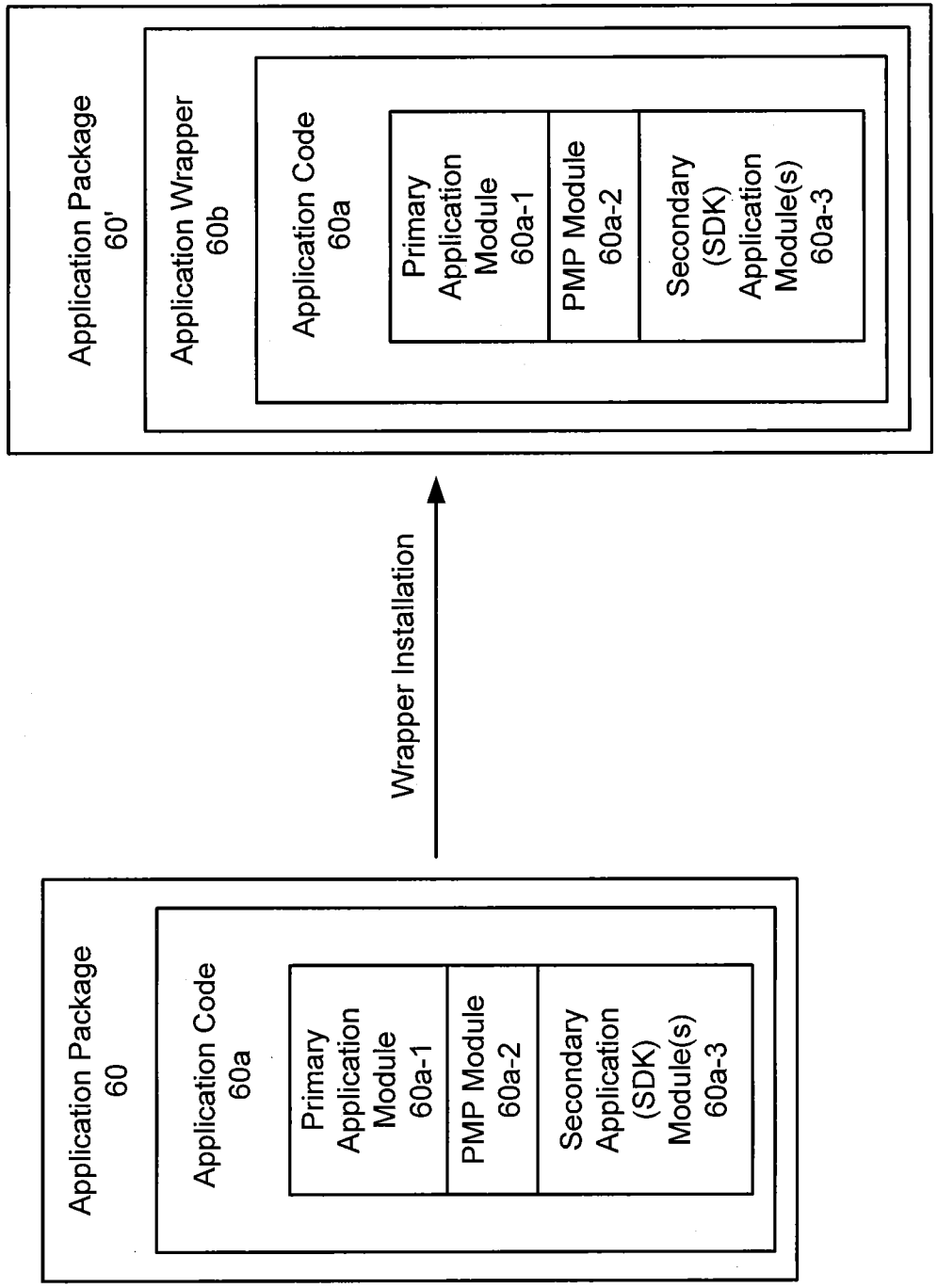
FIG. 2 is a block diagram illustrating wrapper installation for the application package of FIG. 1 and a structure of the resulting modified application package according to some embodiments of inventive concepts.

FIG. 2 is a block diagram illustrating application wrapper installation for the application package 60 of FIG. 1 and a structure of the resulting modified application package according to some embodiments of inventive concepts. As shown in FIG. 2, before wrapping, application package 60 may include application code 60*a* (including primary application module 60*a*-1, PMP module 60*a*-2, and secondary application module 60*a*-3). The modified application package 60' is generated that includes the application wrapper 60*b* installed "around" the application code to encapsulate the application code 60*a*. The application code 60*a* is typically modified to include hooks (program code) that facilitate integration with the application wrapper 60*b*. When the application package 60' is installed on a device 301, the operating system 302 may install the application code 60*a* wrapped by the application wrapper 60*b* onto the device.

Figure 3:
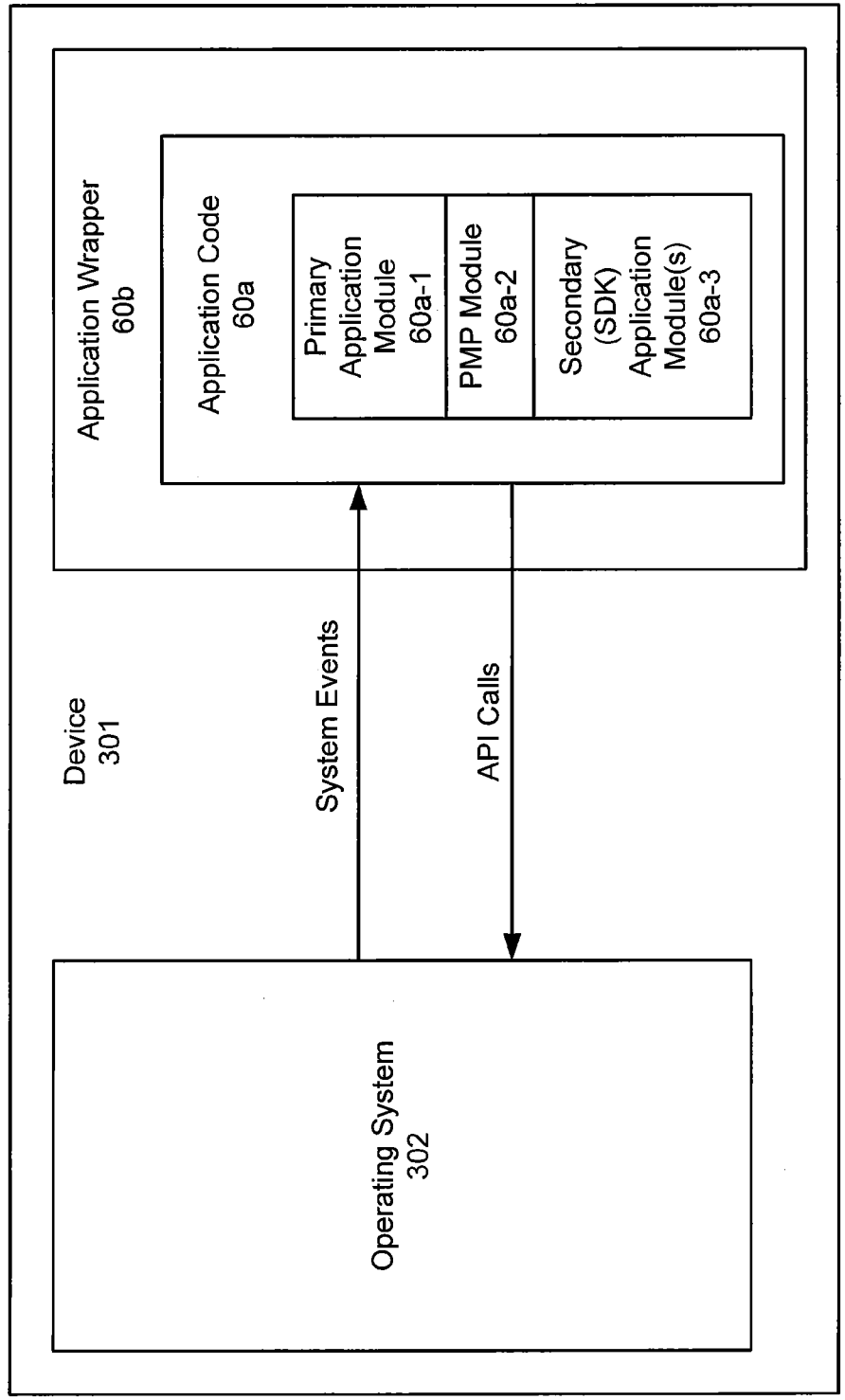
FIG. 3 is a block diagram illustrating interactions between the installed application of FIGS. 1 and 2 and a device operating system according to some embodiments of inventive concepts.

FIG. 3 is a block diagram illustrating operation of the application wrapper 60*b* encapsulating the application code 60*a* on a device 301 which includes an operating system 302. The operating system 302 notifies the application code 60*a* of system events associated with the application. A system event is an action of the system that must be handled by the program, such as "launch app", "OnStart", "OnStop", etc. For example, the operating system 302 may generate a "launch app" event in response to a user tapping on an app in the user interface of the device 301. System events are processed by a listener function in the application code 60*a*. When an application wrapper 60*b* is installed, however, the application wrapper 60*b* may intercept system events and determine if an action should be taken in response to the system event. For example, the application wrapper 60*b* may record the system event, generate a notification in response to the system event, etc.

The logic of the application wrapper 60*b* may also determine whether or not the system event should be passed along to the application code 60*a*. Accordingly, the application wrapper 60*b* may implement logic that listens for system events provided to the application code 60*a*. Note that the listener function of the application code 60*a* may be left in place to process system events that are passed through to the application code 60*a* by the application wrapper 60*b*.

For example, the operating system 302 may generate an "onResume" event which is intercepted by the application wrapper 60*b*. If the logic in the application wrapper 60*b* determines that the application 60*a* is not authorized to resume, then the application wrapper 60*b* blocks the event by not forwarding it to the listener function in the application code 60*a*.

The application wrapper 60*b* may also intercept application programming interface (API) calls made by the application code 60*a* to the operating system 302. The application code 60*a* may issue an API call to request services from the operating system 302. For example, an API call may be used to turn on a camera, to read data from storage, to display an image on a screen, or to invoke any other functionality provided by the operating system 302.

The application wrapper 60*b* may pass the API call along to the operating system 302. Before the API call is passed to the operating system 302, the logic of the application wrapper 60*b* determines if any action needs to be taken in response to the API call and may also determine whether or not to pass the API call along to the operating system 302.

In general, the application wrapper 60*b* includes executable code that monitors and/or controls behavior of the application code 60*a* by intercepting one or more API calls by the application code 60*a*, executes monitoring and/or control code in response to the API call, and thereafter returns control to the application code 60*a* and/or passes the API call to the operating system 302 for processing.

For example, in case the application wrapper 60*b* is designed to limit access to a feature or resource on the device 301 during a designated time frame, the application wrapper 60*b* may intercept an API call from the application code 60*a* that invokes the feature and, if the API call is made outside the designated time frame, generate and return an error code to the application code 60*a* instead of passing the API call on to the operating system 302.

Figure 4:
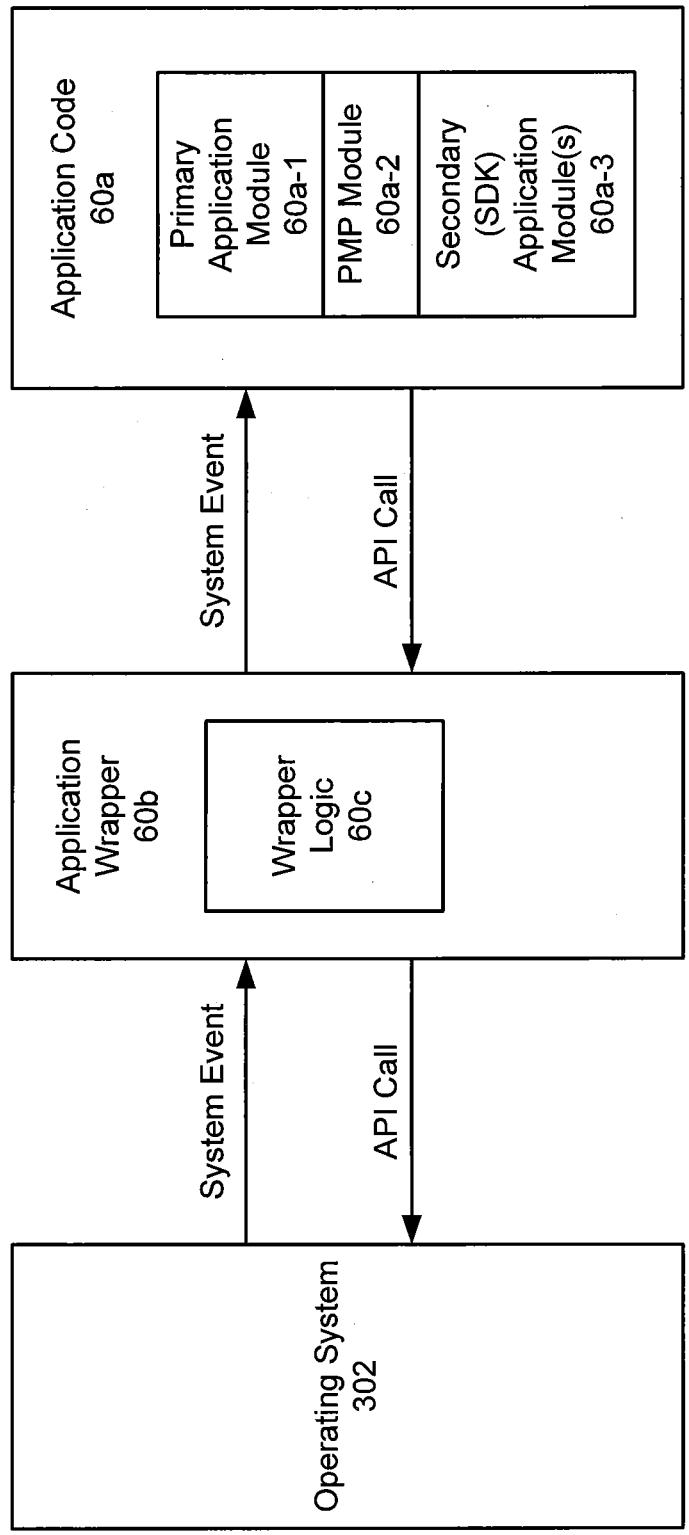
FIG. 4 is a block diagram illustrating a logical arrangement of the application wrapper of FIG. 3 between the operating system and the application code according to some embodiments of inventive concepts.

FIG. 4 is a block diagram illustrating a logical arrangement of the application wrapper 60*b* of FIG. 3 between the operating system 302 and the application code 60*a* according to some embodiments of inventive concepts. The application wrapper 60*b* includes wrapper logic 60*c* that determines how intercepted system events and API calls are processed by the application wrapper 60*b*.

As shown in FIG. 4, the application wrapper 60*b* intervenes between the operating system 302 and the application code 60*a* and filters and/or operates on system events and API calls passing between the operating system 302 and the application code 60*a*. When a system event is generated and sent to the application code 60*a* by the operating system 302, a first listener function in the application wrapper 60*b* intercepts the system event and passes it to the wrapper logic 60*c*. The wrapper logic 60*c* determines how to respond to the system event and whether or not to pass the system event along to the application code 60*a*.

A second listener function in the application wrapper 60*b* listens for API calls from the application code 60*a*, and passes the API calls to the wrapper logic 60*c*. The wrapper logic 60*c* determines how to respond to the API call, whether to modify the API call, and whether or not to pass the API call or the modified API call along to the operating system 302.

For example, assume that the application code 60*a* issues a system log API call to log an event that occurred during operation of the application code 60*a* to a system log. The wrapper logic 60*c* may determine that the event should be logged to a separate event log, and may modify the API call to log the event to the separate event log rather than to the system log.

It will be appreciated that many different types of wrapping/instrumentation tools are offered by various vendors. For example, application monitoring tools are available, such as Flurry, CA Mobile Application Analytics, and Tealeaf. Testing tools, such as IBM Rational Test Workbench Mobile, MonkeyTalk, Jamo, SeeTest and Squish are also available, while management applications are also available, such as CA Mobile Application Management, AirWatch, MobileIron and Fibrelink. In some cases, it is desirable to apply two different wrapping applications to a single application program so that, for example, the application can be both monitored and managed simultaneously.

Application wrapper 60*c* may thus provide an interface between application code 60*a* (including primary application module 60*a*-1, PMP module 60*a*-2, and secondary application module 60*a*-3) controlling interactions between all modules of the application code 60*a* and operating system 302. Application wrapper 60*b*, however, may not be able to distinguish between system events and/or API calls that relate to primary application module 60a-1 and system events and/or API calls that relate to secondary application module 60a-3. PMP module 60a-2 is thus integrated in application code 60a to selectively monitor, control, and/or block operations of secondary application module 60a-3 relative to operations of primary application module 60a-1. PMP module 60a-2 is thus shown between primary application module 60a-1 and secondary application module 60a-3 to schematically illustrate a separation of primary and secondary application modules. It will be understood, however, that PMP module 60a-2 may be shown in other configurations. PMP module may be provided as an element of application wrapper 60b, and/or portions of PMP module may be split between application code 60a and application wrapper 60b.

Figure 8:
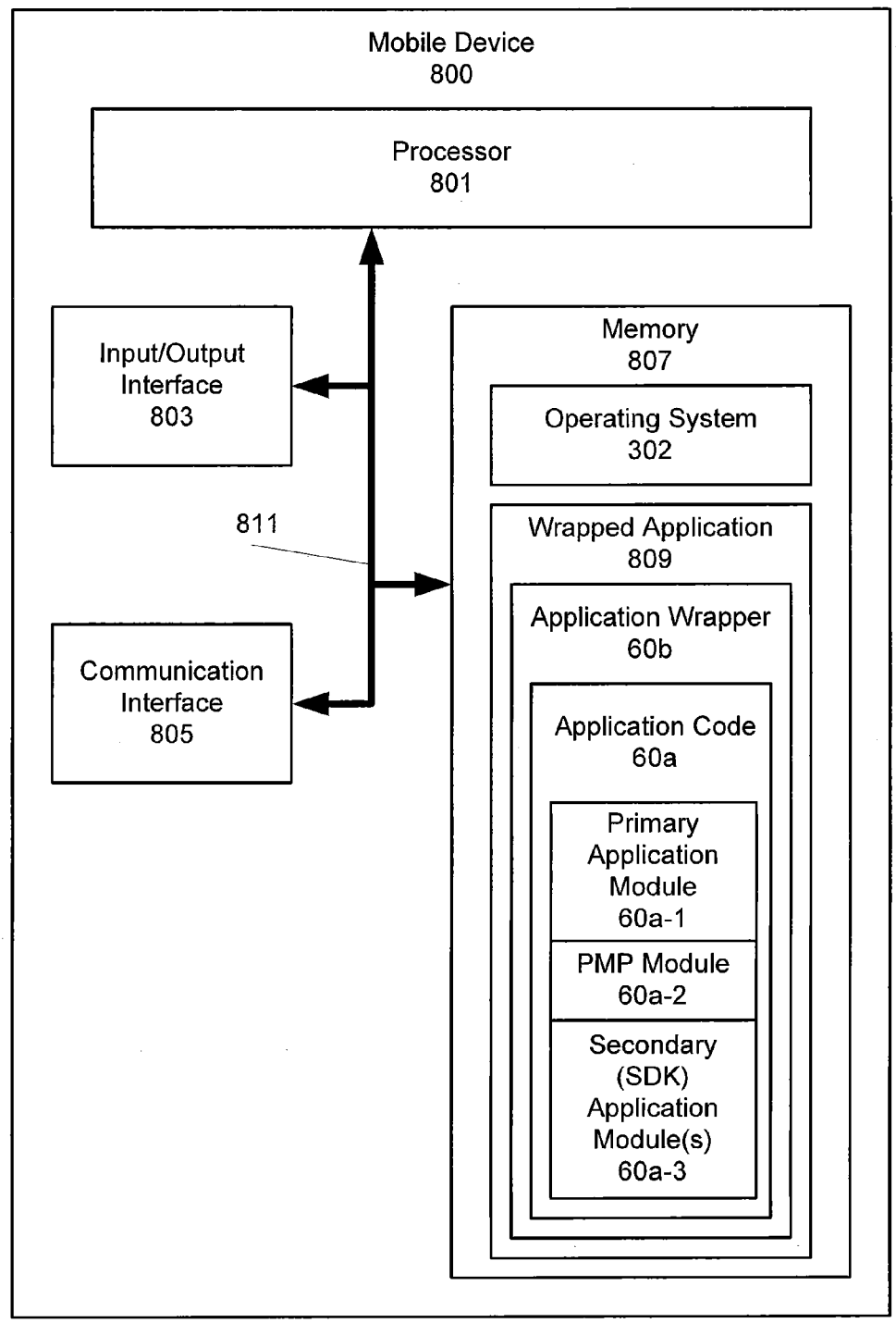
FIG. 8 is a block diagram illustrating a mobile device including an application according to some embodiments of inventive concepts.

FIG. 8 is a block diagram of a mobile device 800 (such as a smartphone or a tablet computer) configured to run the wrapped application 809 (including application wrapper 60b and application code 60a with primary application module 60a-1, PMP module 60a-2, and secondary application module 60a-3) using the operating system 302 as discussed above. As shown, mobile device 800 may include processor 801, input/output interface 803, communication interface 805, and memory 807, all electrically coupled over a system bus 811. Communication interface 805 may include a wireless transceiver, for example, providing wireless communication with a wide area wireless network (e.g., a cellular/satellite radio access network) and/or with a local area wireless network (e.g., a WiFi network). Input/Output interface 803 may include a display, a keypad, a touch sensitive display (combining functionality of a conventional display and a keypad), a microphone, a speaker, a still/video camera, one or more buttons, etc. Input/Output interface 803 can thus accept user input and provide still/video image and/or audio output.

As further shown in FIG. 8, operating system 302 and wrapped application 809 (including application wrapper 60b, and application code 60a with primary application module 60a-1, PMP module 60a-2, and secondary application module 60a-3) may be installed/stored in memory 807. Processor 801 can thus perform operations of operating system 807 and application code 60a responsive to user input through input elements of input/output interface 803 to provide audio/image output through output elements of input/output interface 803.

Figure 5:
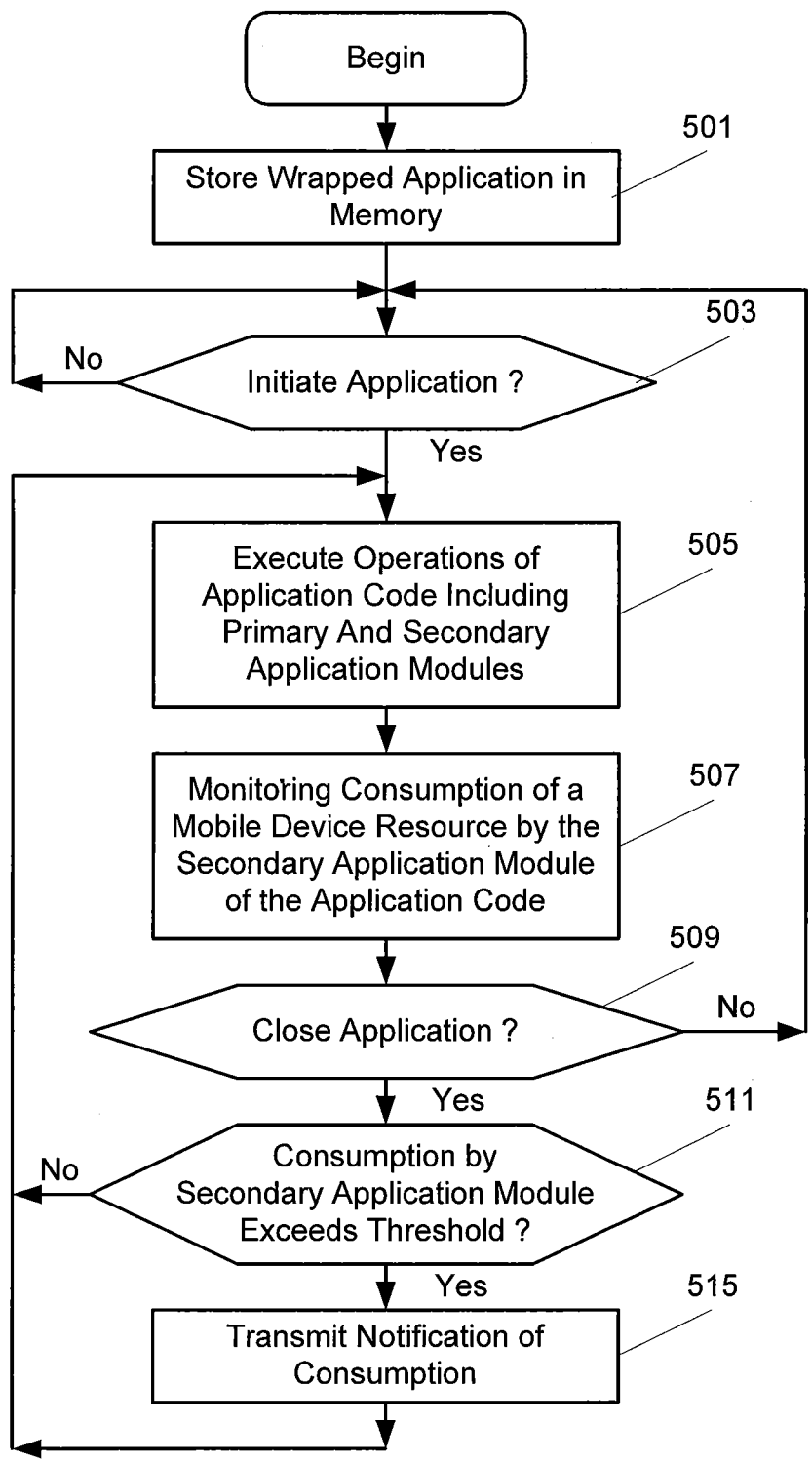
FIGS. 5, 6, and 7 are flow charts illustrating processor operations using applications according to some embodiments of inventive concepts.
Figure 6:
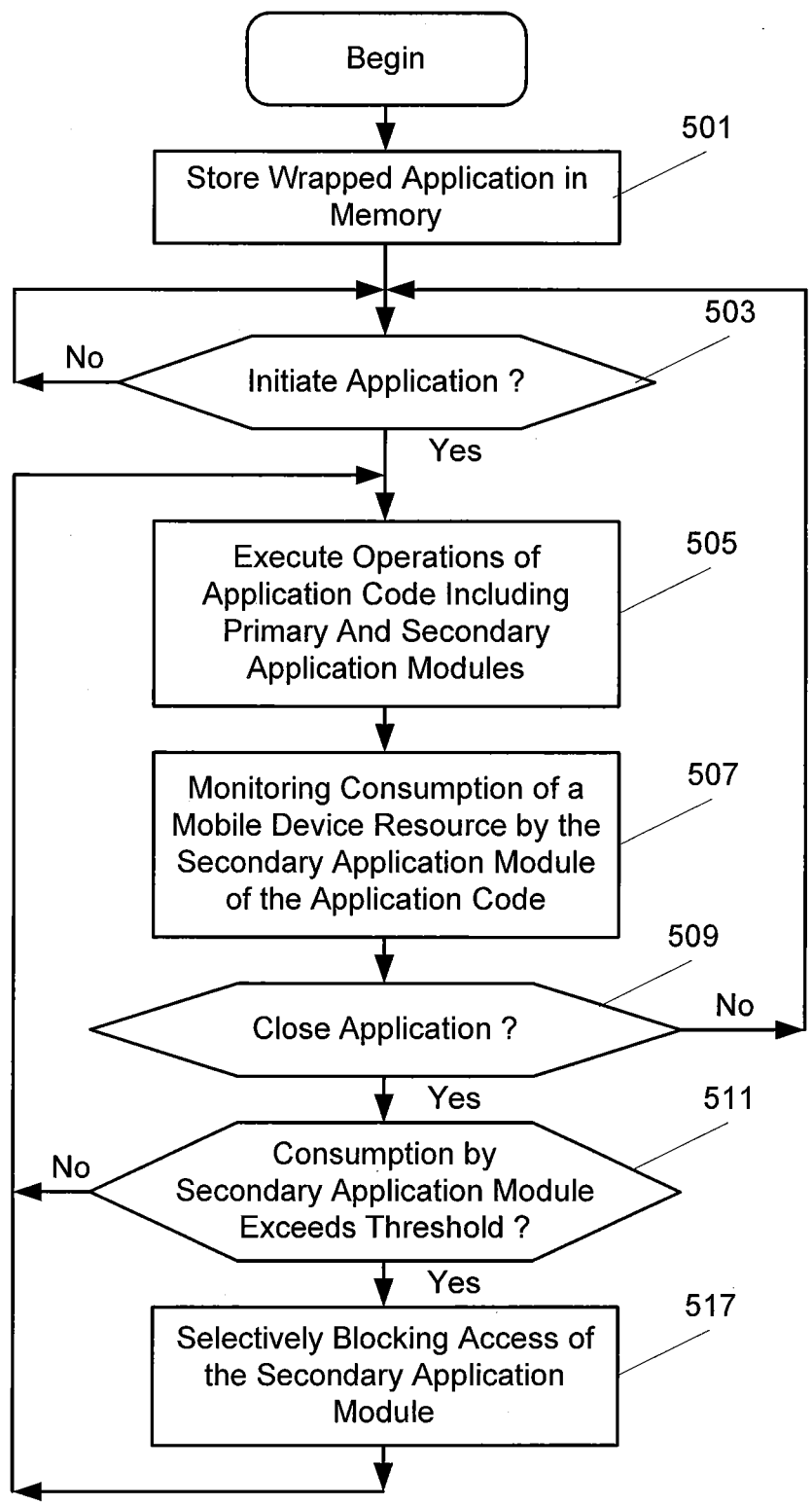
Figure 7:
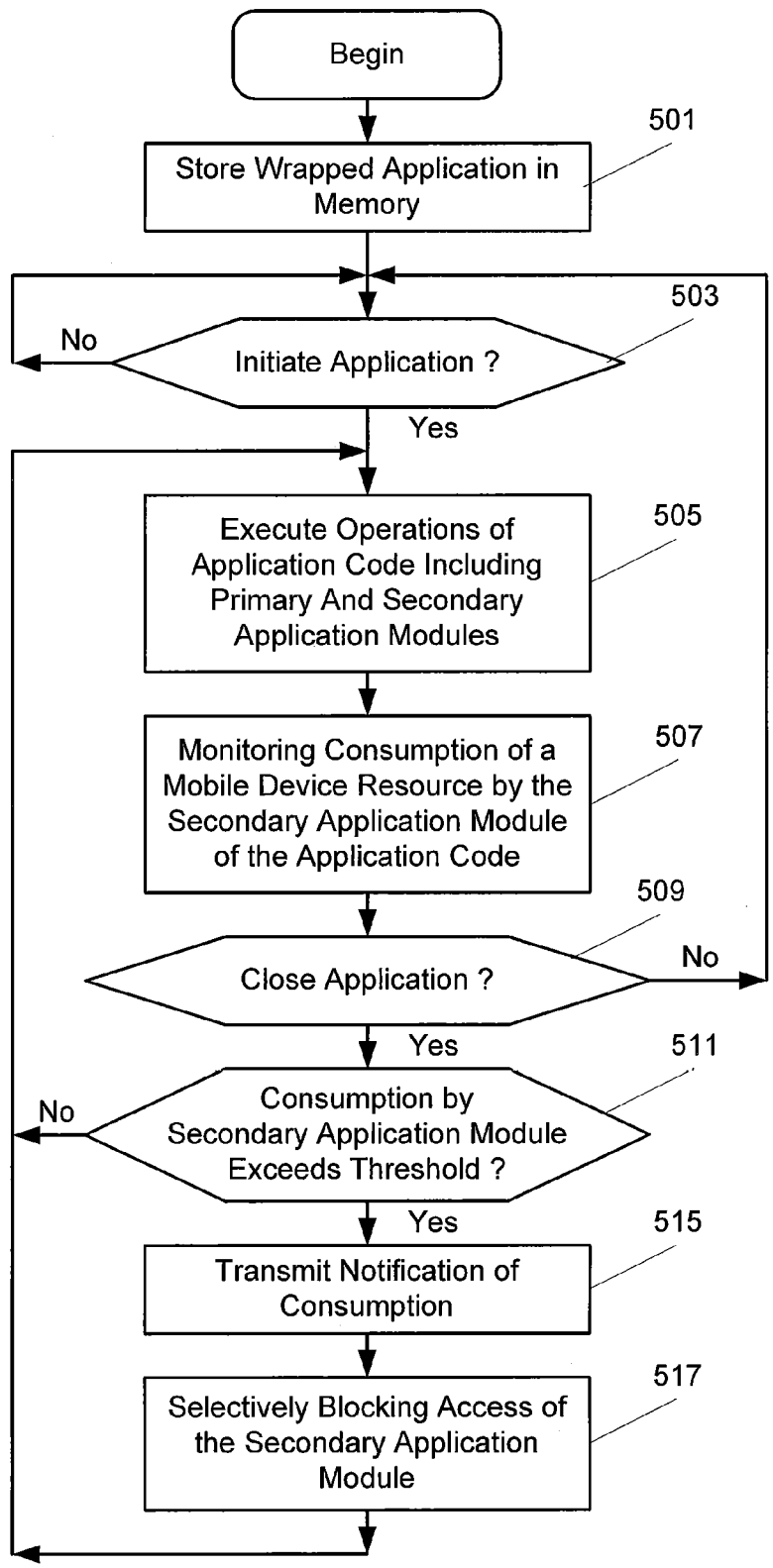

FIGS. 5, 6, and 7 are flow charts illustrating processor operations using applications according to some embodiments of inventive concepts.

According to embodiments illustrated in FIG. 5, the application 809 may be run on mobile device 800 including memory 807 with operating system 302 stored therein as discussed above with respect to FIG. 8, and processor 801 may operate in accordance with operating system 302. At block 501, processor 801 may store wrapped application 809 in memory 807 with wrapped application 807 including application code 60a and an application wrapper 60b providing an interface between application code 60a and operating system 302. Moreover, application code 60a may integrate primary application module 60a-1 providing a primary functionality of the application, policy monitoring plugin module 60a-2, and secondary application module 60a-3 providing a secondary functionality of the application. Primary application module 60a-1, for example, may include code to provide media content (e.g., print media content such as newspaper or magazine content, music/audio streaming, video streaming, etc.), gaming, and/or other user desired functionality at a mobile device, and secondary application module 60a-3 (developed using a third party SDK) may include code to provide advertisements at the mobile device.

At block 503, processor 801 may initiate operations of the application responsive to user input received through a user input device of input/output interface 803. For example, processor 801 may initiate operations of the application responsive to user selection of an icon on a touch sensitive display of input/output interface 803.

Responsive to initiating operations of the application at block 503, processor may execute operations of application code 60a including primary and secondary application modules 60a-1 and 60a-3 using system events provided from operating system 302 to application code 60a using an interface of application wrapper 60b, and/or using API calls provided from application code 60a to operating system 302 using the interface of application wrapper 60b.

According to some embodiments, secondary application module 60a-3 may be configured to provide an advertisement(s) on a display of input/output interface 803 responsive to a user initiating the application and before operations of primary application module 60a-1 are performed in accordance with primary application module 60a-1. In addition or in an alternative, secondary application module 60a-2 may be configured to provide advertisements on the display of input/output interface 803 at periodic and/or random intervals while operations of primary application module 60a-1 are being performed. As used herein, the term interrupt may include initially delaying operation of primary application module 60a-1 and interrupting operation of primary application module 60a-1 after initiating operations of primary application module 60a-1 and then resuming operations of primary application module 60a-1. Operations of primary application module 60a-1 (e.g., providing media content and/or gaming) may thus be delayed/interrupted by operations of second application module 60a-3 (e.g., to provide advertisements).

Responsive to executing operations of the primary and/or secondary application modules of application code 507, processor 801 may monitor consumption of a mobile device resource by secondary application module 60a-3 providing the secondary functionality of application code 60a using policy monitoring plugin (PMP) module (60a-2) of the application at block 507. For example, monitoring consumption of a mobile device resource may include monitoring consumption of at least one of central processing unit (CPU) utilization, memory utilization, battery consumption, network traffic snooping, and/or location access control.

Monitoring consumption at block 507 may include monitoring consumption of a mobile device resource by secondary application module 60a-3 (providing the secondary functionality) relative to consumption of the mobile device resource by application code 60a including consumption of the mobile device resource by primary application module 60a-1 providing the primary functionality. For example, monitoring consumption may include monitoring consumption by secondary application module 60a-3 as a ratio/percentage of consumption by all modules of application code 60a, and/or as a ratio/percentage of consumption by primary application module. According to some other embodiments, monitoring consumption may include monitoring consumption by secondary application module 60a-3 relative to threshold that is independent of consumption by other modules of application code 60a.

Responsive to the consumption of the mobile device resource by the secondary application module exceeding a threshold at block 511, processor 801 may transmit a notification of the consumption through wireless communication interface 805 of mobile device 800 to a third party source of application code 60*a* at block 515 using policy monitoring plugin module 60*a*-2 of the application and the interface of application wrapper 60*b*. According to some embodiments, transmitting the notification at block 515, for example, may include transmitting the notification responsive to the consumption of the mobile device resource by the secondary application module 60*a*-3 exceeding a threshold percentage (also referred to as a ratio) of a total consumption of the mobile device resource by application code 60*a*-1 including the primary and secondary application modules. According to some other embodiments, the notification may be transmitted responsive to the consumption of the mobile device resource by secondary application module 60*a*-3 exceeding a percentage (also referred to as a ration) of consumption by all modules of application code 60*a*. According to still other embodiments, the notification may be transmitted responsive to the consumption of the mobile device resource by secondary application module 60*a*-3 exceeding a percentage (also referred to as a ratio) of consumption by primary application module 60*a*-1. According to yet other embodiments, the notification may be transmitted responsive to the consumption of the mobile device resource by secondary application module 60*a*-3 exceeding a threshold that is independent of consumption by other modules of application code 60*a*.

According to embodiments illustrated in FIG. 6, operations of blocks 501, 503, 505, 507, 509, and 511 may be substantially the same as discussed above with respect to FIG. 5. Responsive to the consumption of the mobile device resource by the secondary application module exceeding the threshold at block 511, however, processor 801 may selectively block access of secondary application module 60*a*-3 to a source of information at block 517 while continuing to allow access of primary application module 60*a*-1 to the source of information. Determinations of such thresholds may be the same as discussed above with respect to block 511 of FIG. 5.

According to some embodiments of FIG. 6, processor 801 may selectively block access of secondary application module 60*a*-3 to mobile device location information (e.g., Global Positioning System or GPS information) at block 517 while continuing to allow access of primary application module 60*a*-1 to the mobile device location information. According to some other embodiments, processor 801 may selectively block access of secondary application module 60*a*-3 to a sandbox file at block 517 while continuing to allow access of primary application module 60*a*-1 to the sandbox file.

According to yet other embodiments, processor 801 may selectively block access of secondary application module 60*a*-3 to initiate application program interface (API) calls at block 517 while continuing to allow access of primary application module 60*a*-1 to initiate application program interface (API) calls that are provided to operating system 302 using the interface of application wrapper 60*b*. For example, processor 801 may selectively block access of secondary application module 60*a*-3 to initiate API calls at block 517 to a camera (of interface 803), a photo library (stored in memory 807), a microphone (of interface 803), an external storage device interface (coupled to bus 811), phone interface/contacts (stored in memory 807), location services (e.g., GPS services provided by a GPS receiver), network (e.g., Internet) access, and/or encryption/decryption services. According to still other embodiments, processor 801 may selectively block access of secondary application module 60*a*-3 from receiving system events from operating system 302 at block 517 while continuing to allow primary application module 60*a*-3 to receive system events from operating system 302 using the interface of application wrapper 60*b*. For example, processor 801 may selectively block access of secondary application module 60*a*-3 to receive system events at block 517 from a camera (of interface 803), a photo library (stored in memory 807), a microphone (of interface 803), an external storage device interface (coupled to bus 811), phone interface/contacts (stored in memory 807), location services (e.g., GPS services provided by a GPS receiver), network (e.g., Internet) access, and/or encryption/decryption services.

According to embodiments illustrated in FIG. 7, operations of blocks 501, 503, 505, 507, 509, and 511 may be substantially the same as discussed above with respect to FIG. 5. In FIG. 7, however, operations of block 515 of FIG. 5 and 517 of FIG. 6 may both be performed responsive to resource consumption by secondary application module 60*a*-3 exceeding the threshold of FIG. 511.

According to some embodiments, primary application module 60*a*-1 may provide a primary functionality of gaming and/or media content access, and secondary application module 60*a*-3 may provide a secondary functionality of advertising. Accordingly, executing operations of application code 60*a* at block 505 may include using primary application module 60*a*-1 to provide gaming and/or media content access at mobile device 800 through a display and/or an audio output of input/output interface 803 based on data received over wireless communication interface 805, and using secondary application module 60*a*-3 to delay/interrupt the gaming and/or media content access of primary application module 60*a*-1 to provide an advertisement through the display and/or audio output of input/output interface 803 based on data received over wireless communication interface 805.

According to some embodiments of FIGS. 5-7, a configuration file may be provided in mobile device memory 807 for PMP module 60*a*-2 to define parameters for monitoring such as mobile device resources to be monitored, thresholds for notifications/blocking, and/or access to be blocked. Moreover, the configuration file may be revised/updated by a developer of the application, for example, responsive to notifications of block 515.

For example, monitoring consumption at block 507 may include providing a first list of at least one mobile device resource in the configuration file, and monitoring consumption of a mobile device resource at block 507 based on the first list in the configuration file (e.g., during initial iterations through block 507). After initial iterations through block 507, a second list of at least one mobile device resource may be provided in the configuration file based on information received over wireless interface 805 after monitoring based on the first list, and a mobile device resource may be monitored based on the second list in the configuration file after providing the second list. More particularly, the first and second lists may be different.

Such a configuration file may also be used to define/modify the threshold of blocks 507 and 511. For example, monitoring/deciding of blocks 507/511 may include initially monitoring based on a first threshold of the configuration file, and transmitting the notification and/or blocking access of blocks 515/517 may initially include transmitting/blocking based on the consumption exceeding the first threshold. After initial iterations through blocks 507, 511, 515, and/or 517, a second threshold may be provided based on information received over wireless communication interface 805. Responsive to the consumption of the mobile device resource by secondary application module 60a-3 exceeding the second threshold, transmitting a second notification of consumption through wireless communication interface 805 of mobile device 800 to a third party source of application code 809 using policy monitoring plugin module 60a-2 of the application and the interface of application wrapper 60b.

If the first list of the configuration file identifies a plurality of mobile device resources to be monitored at block 507, the configuration file may identify a respective threshold for each resource, monitoring at block 507 may include monitoring each resource of the first list, and deciding at block 511 may include deciding based on a comparison of consumption of each resource with the respective threshold. Moreover, a different notification may be provided at block 515 for each resource being monitored (e.g., the notification may identify the particular resource that triggered the notification), and/or access to a different source(s) may be blocked at block 517 for each resource being monitored (e.g., the blocking may be different depending on the resource that triggered the blocking).

In addition or in an alternative, the configuration file may be used to define/modify the source of information that is to be blocked at block 517. For example, the configuration file may initially provide a first list of at least one source of information, and initial iterations through block 517 may include selectively blocking access based on the first list of at least one source of information. After selectively blocking based on the first list, a second list of at least one source of information may be provided in the configuration file based on information received over wireless interface 805 after blocking access based on the first list, with the first and second lists being different. After providing the second list in the configuration file, access of secondary application module 60a-3 to a source of information may be selectively blocked based on the second list while continuing to allow access of primary application module 60a-1 to the source of information.

Although some operations are described herein as being executed by a processor, the operations are not necessarily executed by the same processor. In other words, at least one processor may execute the operations described herein and illustrated by the accompanying drawings.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of running a wrapped application on a mobile device including a wireless communication interface and a memory with an operating system stored therein and a processor operating according to the operating system, the method comprising:
storing the wrapped application in the memory of the mobile device wherein the wrapped application includes application code and an application wrapper providing an interface between the application code and the operating system, and wherein the application code integrates a primary application module providing a primary functionality of the wrapped application, a policy monitoring plugin module, and a secondary application module providing a secondary functionality of the wrapped application;
executing operations of the application code including the primary and secondary application modules on the processor using system events provided from the operating system to the application code using the interface of the application wrapper and/or using API calls provided from the application code to the operating system using the interface of the application wrapper;
responsive to executing operations of the primary and/or secondary application modules of the application code, monitoring consumption of a mobile device resource by the secondary application module providing the secondary functionality of the application code using the policy monitoring plugin module of the wrapped application; and
responsive to the consumption of the mobile device resource by the secondary application module exceeding a threshold, transmitting a notification of the consumption through the wireless communication interface of the mobile device to a third party source of the application code using the policy monitoring plugin module of the wrapped application and the interface of the application wrapper.

2. The method of claim 1 wherein monitoring consumption comprises monitoring consumption of the mobile device resource by the secondary application module providing the secondary functionality relative to consumption of the mobile device resource by the application code including consumption of the mobile device resource by the primary application module providing the primary functionality.

3. The method of claim 2 wherein transmitting the notification comprises transmitting the notification response responsive to the consumption of the mobile device resource by the second application module exceeding a threshold percentage of a total consumption of the mobile device resource by the application code including the primary and secondary application modules.

4. The method of claim 2 wherein the mobile device resource comprises at least one of central processing unit (CPU) utilization, memory utilization, battery consumption, network traffic snooping, and/or location access control.

5. The method of claim 1 wherein the mobile device resource comprises central processing unit (CPU) utilization.

6. The method of claim 1 wherein the mobile device resource comprises memory utilization.

7. The method of claim 1 wherein the mobile device resource comprises battery consumption.

8. The method of claim 1 wherein the mobile device resource comprises network traffic snooping.

9. The method of claim 1 wherein the mobile device resource comprises location access control.

10. The method of claim 1 further comprising:
responsive to the consumption of the mobile device resource by the secondary application module exceeding a threshold, selectively blocking access of the secondary application module to a to source of information while continuing to allow access of the primary application module to the source of information.

11. The method of claim 1 wherein the secondary application module is based on a software development kit (SDK) developed by a third party relative to a developer of the primary application module.

12. The method of claim 1,
wherein the primary application module provides a primary functionality of gaming and/or media content access,
wherein the secondary application module provides a secondary functionality of advertising,
wherein executing operations of the application code includes
using the primary application module to provide gaming and/or media content access through a display and/or an audio output of the mobile device based on data received over the wireless communication interface, and
using the secondary application module to delay or interrupt the gaming and/or media content access of the primary application module to provide an advertisement through the display and/or audio output of the mobile device based on data received over the wireless communication interface.

13. The method of claim 1 wherein monitoring consumption comprises,
providing a first list of at least one mobile device resource in the memory,
monitoring consumption of a mobile device resource based on the first list in the memory,
providing a second list of at least one mobile device resource in the memory based on information received over the wireless interface after monitoring based on the first list, and
monitoring consumption of a mobile device resource based on the second list in the memory after providing the second list, wherein the first and second lists are different.

14. A method of running a wrapped application on a mobile device including a wireless communication interface and a memory with an operating system stored therein and a processor operating according to the operating system, the method comprising:
storing the wrapped application in the memory of the mobile device wherein the wrapped application includes application code and an application wrapper providing an interface between the application code and the operating system, and wherein the application code integrates a primary application module providing a primary functionality of the wrapped application, a policy monitoring plugin module, and a secondary application module providing a secondary functionality of the wrapped application;
executing operations of the application code including the primary and secondary application modules on the processor using system events provided from the operating system to the application code using the interface of the application wrapper and/or using API calls provided from the application code to the operating system using the interface of the application wrapper;
responsive to executing operations of the primary and/or secondary application modules of the application code, monitoring consumption of a mobile device resource by the secondary application module providing the secondary functionality using the policy monitoring plugin module of the wrapped application; and
responsive to the consumption of the mobile device resource by the secondary application module exceeding a threshold, selectively blocking access of the secondary application module to a source of information while continuing to allow access of the primary application module to the source of information.

15. The method of claim 14 wherein monitoring consumption comprises monitoring consumption of the mobile device resource by the secondary application module providing the secondary functionality relative to consumption of the mobile device resource by the application code including consumption of the mobile device resource by the primary application module providing the primary functionality.

16. The method of claim 15 wherein selectively blocking comprises selectively blocking the access of the secondary application module responsive to the consumption of the mobile device resource by the secondary application module exceeding a threshold percentage of a total consumption of the mobile device resource by the application code including the primary and secondary application modules.

17. The method of claim 16 wherein selectively blocking access comprises selectively blocking access of the secondary application module to mobile device location information while continuing to allow access of the primary application module to the mobile device location information, selectively blocking access of the secondary application module to a sandbox file while continuing to allow access of the primary application module to the sandbox file, and/or selectively blocking access of the secondary application module to initiate application program interface (API) calls while continuing to allow access of the primary application module to generate application program interface (API) calls that are provided to the operating system using the interface of the application wrapper.

18. The method of claim 14 wherein selectively blocking access comprises selectively blocking access of the secondary application module to mobile device location information while continuing to allow access of the primary application module to the mobile device location information.

19. The method of claim 14 wherein selectively blocking access comprises selectively blocking access of the secondary application module to a sandbox file while continuing to allow access of the primary application module to the sandbox file.

20. The method of claim 14 wherein selectively blocking access comprises selectively blocking access of the secondary application module to initiate application program interface (API) calls while continuing to allow access of the primary application module to generate application program interface (API) calls that are provided to the operating system using the interface of the application wrapper.

21. The method of claim 14 further comprising:
responsive to the consumption of the mobile device resource by the secondary application module exceeding a threshold, transmitting a notification through a wireless communication interface of the mobile device to a third party source of the application code using the policy monitoring plugin module of the wrapped application and the interface of the application wrapper.

22. The method of claim 14 wherein selectively blocking access comprises,
providing a first list of at least one source of information in the memory,
selectively blocking access based on the first list of at least one source of information,
after selectively blocking based on the first list, providing second list of at least one source of information in the memory based on information received over the wireless interface after blocking access based on the first list wherein the first and second lists are different, and
after selectively blocking access based on the first list, selectively blocking access of the secondary application module to a source of information based on the second list while continuing to allow access of the primary application module to the source of information.

* * * * *